United States Patent
Chian et al.

(10) Patent No.: US 7,798,107 B2
(45) Date of Patent: Sep. 21, 2010

(54) TEMPERATURE CONTROL SYSTEM FOR A WATER HEATER

(75) Inventors: Brent Chian, Plymouth, MN (US); Timothy J. Nordberg, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 277 days.

(21) Appl. No.: 11/939,764

(22) Filed: Nov. 14, 2007

(65) Prior Publication Data

US 2009/0120380 A1    May 14, 2009

(51) Int. Cl.
    *F24H 9/20*    (2006.01)
(52) U.S. Cl. .................. 122/14.22; 236/20 R; 700/300
(58) Field of Classification Search ............... 122/14.1, 122/14.2, 14.22; 236/20 R, 78 B; 219/483, 219/492; 700/299, 300, 304
    See application file for complete search history.

(56) References Cited

U.S. PATENT DOCUMENTS

| | | |
|---|---|---|
| 3,847,350 A | 11/1974 | Thompson |
| 3,849,350 A | 11/1974 | Matsko |
| 4,305,547 A * | 12/1981 | Cohen ..................... 236/18 |
| 4,324,944 A | 4/1982 | Weihrich et al. |
| RE30,936 E | 5/1982 | Kmetz et al. |
| 4,333,002 A | 6/1982 | Kozak |
| 4,467,178 A | 8/1984 | Swindle |
| 4,508,261 A | 4/1985 | Blank |
| 4,511,790 A | 4/1985 | Kozak |
| 4,568,821 A | 2/1986 | Boe |
| 4,588,875 A | 5/1986 | Kozak et al. |
| 4,692,598 A | 9/1987 | Yoshida et al. |
| 4,696,639 A | 9/1987 | Bohan, Jr. |
| 4,734,658 A | 3/1988 | Bohan, Jr. |
| 4,742,210 A | 5/1988 | Tsuchiyama et al. |
| 4,770,629 A | 9/1988 | Bohan, Jr. |
| 4,834,284 A | 5/1989 | Vandermeyden |
| 4,984,981 A | 1/1991 | Pottebaum |
| 4,986,468 A | 1/1991 | Deisinger |
| 5,007,156 A | 4/1991 | Hurtgen |
| 5,103,078 A | 4/1992 | Boykin et al. |

(Continued)

FOREIGN PATENT DOCUMENTS

EP    0356609    3/1990

(Continued)

OTHER PUBLICATIONS

U.S. Appl. No. 10/911,151, filed Aug. 3, 2004.

(Continued)

*Primary Examiner*—Gregory A Wilson
(74) *Attorney, Agent, or Firm*—Crompton Seager & Tufte LLC

(57) ABSTRACT

A system for detecting stacking and controlling temperature in a water heater. A controller with a connection to a temperature sensor and heating element in a water tank of the heater may be designed to limit stacking and its effects. The controller may use a sensing and calculation technique to detect the stacking. If stacking is detected, then the setpoint for the heater may be lowered so that the outlet water temperature is within a safe limit. If stacking is not detected, then the setpoint may be gradually restored to optimize water heater capacity.

21 Claims, 13 Drawing Sheets

U.S. PATENT DOCUMENTS

| | | | |
|---|---|---|---|
| 5,442,157 A | 8/1995 | Jackson | |
| 5,622,200 A | 4/1997 | Schulze | |
| 5,660,328 A | 8/1997 | Momber | |
| 5,797,358 A | 8/1998 | Brandt et al. | |
| 5,896,089 A | 4/1999 | Bowles | |
| 5,968,393 A | 10/1999 | Demaline | |
| 5,975,884 A | 11/1999 | Dugger | |
| 6,053,130 A | 4/2000 | Shellenberger | |
| 6,059,195 A | 5/2000 | Adams et al. | |
| 6,069,998 A | 5/2000 | Barnes et al. | |
| 6,075,923 A | 6/2000 | Wu | |
| 6,208,806 B1 | 3/2001 | Langford | |
| 6,212,894 B1 | 4/2001 | Brown et al. | |
| 6,261,087 B1 | 7/2001 | Bird et al. | |
| 6,271,505 B1 | 8/2001 | Henderson | |
| 6,293,471 B1 | 9/2001 | Stettin et al. | |
| 6,350,967 B1 | 2/2002 | Scott | |
| 6,363,218 B1 | 3/2002 | Lowenstein et al. | |
| 6,375,087 B1 | 4/2002 | Day et al. | |
| RE37,745 E | 6/2002 | Brandt et al. | |
| 6,560,409 B2 | 5/2003 | Troost, IV | |
| 6,633,726 B2 * | 10/2003 | Bradenbaugh | 392/463 |
| 6,701,874 B1 | 3/2004 | Schultz et al. | |
| 6,795,644 B2 | 9/2004 | Bradenbaugh | |
| 6,861,621 B2 | 3/2005 | Ghent | |
| 6,880,493 B2 * | 4/2005 | Clifford | 122/14.22 |
| 6,934,862 B2 | 8/2005 | Sharood et al. | |
| 6,936,798 B2 | 8/2005 | Moreno | |
| 6,955,301 B2 * | 10/2005 | Munsterhuis et al. | 236/20 R |
| 6,959,876 B2 | 11/2005 | Chian et al. | |
| 6,967,565 B2 | 11/2005 | Lingemann | |
| 7,032,542 B2 * | 4/2006 | Donnelly et al. | 122/14.2 |
| 7,088,238 B2 | 8/2006 | Karaoguz et al. | |
| 7,103,272 B2 | 9/2006 | Baxter | |
| 7,117,825 B2 | 10/2006 | Phillips | |
| 7,252,502 B2 | 8/2007 | Munsterhuis | |
| 7,317,265 B2 | 1/2008 | Chian et al. | |
| 7,346,274 B2 * | 3/2008 | Bradenbaugh | 392/478 |
| 7,373,080 B2 | 5/2008 | Baxter | |
| 7,380,522 B2 * | 6/2008 | Krell et al. | 122/14.2 |
| 7,432,477 B2 | 10/2008 | Teti | |
| 2004/0042772 A1 | 3/2004 | Whitford et al. | |
| 2005/0077368 A1 | 4/2005 | Zak et al. | |
| 2005/0150967 A1 | 7/2005 | Chapman, Jr. et al. | |
| 2007/0023333 A1 | 2/2007 | Mouhebaty et al. | |
| 2007/0034169 A1 * | 2/2007 | Phillips | 122/14.1 |
| 2007/0191994 A1 | 8/2007 | Patterson et al. | |
| 2007/0246551 A1 | 10/2007 | Phillips et al. | |
| 2007/0295823 A1 | 12/2007 | Yamada et al. | |
| 2008/0023564 A1 | 1/2008 | Hall | |
| 2008/0188995 A1 | 8/2008 | Hotton et al. | |

FOREIGN PATENT DOCUMENTS

| | | |
|---|---|---|
| EP | 0699316 | 7/1999 |
| GB | 2211331 | 6/1989 |
| JP | 8264469 | 10/1996 |
| JP | 2008008548 | 1/2008 |

OTHER PUBLICATIONS

Lennox, "Network Control Panel, User's Manual," 18 pages, Nov. 1999.

Moog, "M3000 Control System, RTEMP 8, Remote 8-Channel Temperature Controller with CanOpen Interface," 6 pages, Nov. 2004.

* cited by examiner

TEMPERATURE CONTROL SYSTEM FOR A WATER HEATER

BACKGROUND

The present invention pertains to thermal control systems and particularly to control systems for water heaters.

SUMMARY

The present invention is a temperature control system for minimizing stacking in water heaters having a single thermal sensor.

DESCRIPTION

Figure 1:
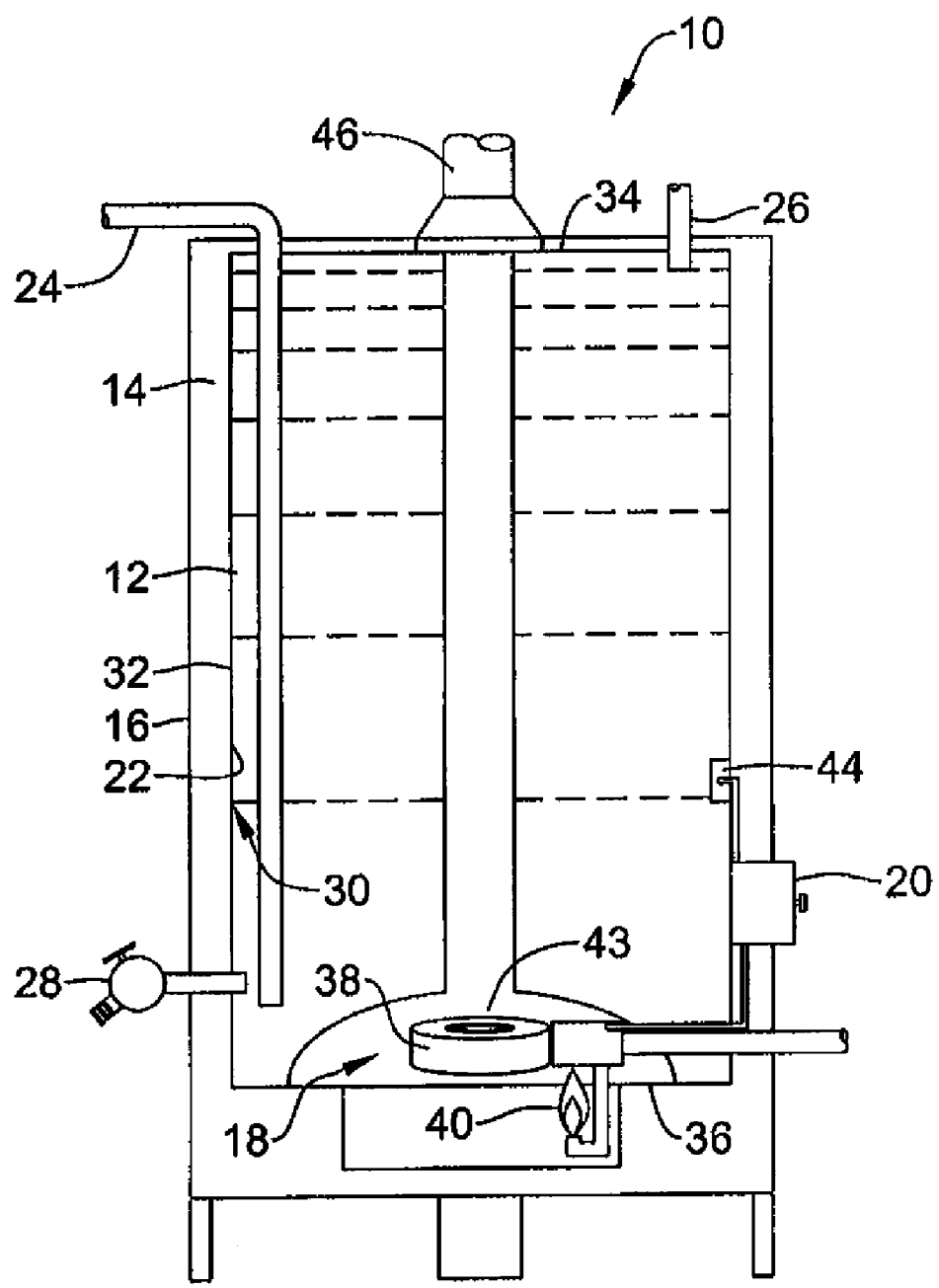
FIG. 1 is cutaway side view of an illustrative water heater.

Water heaters may be used in homes, businesses and just about any establishment that has a need for heated water. Water heaters often heat water using the "heat rises" principle. In operation, water heaters typically heat cold or ambient temperature water entering at or near the bottom of the water heater tank to a desired temperature using a gas-fired burner, an electric heater or some other heating element. During a heating cycle, the cold or ambient temperature water at or near the bottom of the water heater tank becomes hotter and begins to rise towards the top of the water heater tank. Cooler and denser water, once on top of the water being heated, falls toward the bottom of the water heater tank so that it can be heated or reheated to the desired temperature. After the temperature of the water at the bottom of the water heater tank reaches a certain desired temperature, the water heater typically stops heating the water for a period of time.

A water heater may have at least one heating element or "heater," such as a gas-fired burner and/or electric element. To take advantage of the "heat-rises" principle, the heater is typically located at or near the bottom of the water heater tank. A sensor is often provided at or near the bottom end of the water heater tank to sense the temperature of the water. A thermostat or controller is often coupled to the sensor and the heater, and is programmed to control the heater to a water temperature set point based on the sensed temperature.

During operation, when demand for hot water arises (e.g., someone turns on a faucet), fresh, cold or ambient temperature water typically enters the water heater tank at or near the bottom of the water heater tank, and "pushes out" or supplies the hotter water at or near the top of the water heater tank to service the hot water request. Eventually, the fresh, cold or ambient temperature water entering the bottom of the water heater tank causes the temperature of the water at the bottom of the water heater tank to drop below the water temperature set point. The sensor detects when this occurs, and the controller typically turns on and repeats the heat cycling described above to maintain a water temperature at or near the water temperature set point.

Under certain conditions, such as when short water draws occur, the water temperature near the top of the water heater tank can increase well above the water temperature set point, which is sometimes referred to as "stacking". "Stacking" occurs when hotter water located at the top of the water heater tank becomes "stacked" on top of colder water at the bottom of the tank. In some cases, the water at or near the top of the water heater tank may become substantially hotter than the lower, safer temperature water at or near the bottom of the water heater tank.

Water heaters with a single temperature sensor located at or near the bottom of the water heater tank may be particularly susceptible to stacking. The temperature sensor may sense the water temperature at or near the bottom of the water heater tank, which during stacking is less than the water temperature set point, even though the water at or near the top of the water heater tank may be substantially hotter than the water temperature set point. In response, the controller often turns on the heating element of the water heater. Because only a relatively small amount of colder water may be located at or near the bottom of the water heater tank, particularly in short water draw situations, the resulting heating cycles may be relatively short. Also, the heating cycles may occur relatively often. This operation can create and/or exacerbate water "stacking" in the water heater, which in many cases, is undesirable. If stacking is too high, it may cause safety concerns.

FIG. 1 is a cutaway view of a water heater 10. The water heater 10 includes a tank 12, an insulating layer 14, an external shell 16, a heater 18, and a controller 20. Tank 12 holds water that is to be heated and may be constructed of steel or other heat conducting material. Tank 12 has an inner surface 22, an input supply tube or dip tube 24, an output conduit or pipe 26, a drainage valve 28, a rust inhibiting liner 30, and an outer surface 32.

Insulating layer 14 may be located between outer surface 32 of tank 12 and external shell 16. Insulating layer 14 limits or otherwise minimizes the heat loss of the heated water from passing from tank 12 to the outside world. Bonded to the inside of inner surface 22 is rust inhibiting liner 30. In addition, tank 12 may have a sacrificial anode rod (not illustrated) to keep tank 12 from corroding.

Tank 12 also has a top surface 34 and a bottom surface 36. In the illustrated approach, dip tube 24 and output pipe 26 pass through top surface 34. Output pipe 26 extends through top surface 34 to a first predetermined distance from bottom surface 36. This first predetermined distance may result in the output pipe 26 to be fairly close to top surface 34. Positioning output pipe 26 close to top surface 34 allows the hotter water, which may be the hottest water in tank 12, to exit upon demand. In operation, when the hot water is demanded, fresh water flows into dip tube 24, enters tank 12 at or near the bottom, and pushes or otherwise causes the hotter water at the top of tank 12 to exit through output pipe 26.

Dip tube 24 extends through top surface 34 to a second predetermined distance from bottom surface 36. The second predetermined distance may result in the dip tube 24 extending fairly close to bottom surface 36. Positioning the exit of dip tube 24 close to bottom surface 36 allows the fresh, cold or ambient water to enter tank 12 near bottom surface 36. This helps prevent the cold or ambient water from mixing and cooling the hotter water near top surface 34. In practice, dip tube 24 may be located about three quarters of the distance between top surface 34 and the bottom surface 36. Because the cooler water entering tank 12 is denser than heated water, the cooler water tends to sink to the bottom of tank 12, where it may be heated by heater 18.

Heater 18 heats tank 12, which in turn heats any water inside tank 12. Heater 18 may be a gas-fired heater, an electric heater, a plurality of gas-fired burners, a plurality of electric heaters, a combination of gas-fired and electric heaters or any other heat source, as desired.

In the exemplary gas-fired water heater 10 shown in FIG. 1, heater 18 may have a gas-flow valve (not shown), a burner 38 and an ignition source 40. The gas-flow valve may be a solenoid-controlled valve, a linear actuated valve, a motor actuated valve, or any other valve capable of supplying and/or regulating gas flow to burner 38. Ignition source 40 may be a pilot light, a solid-state igniter, an electric heat element, or any other ignition source capable of igniting the gas.

The heat output of heater 18 may be controlled by burner orifice size, gas pressure, and/or time. To produce heat in the gas-fired water heater, gas flows into burner 38 in the combustion chamber 43 through the gas-flow valve, where ignition source 40 ignites the gas. The gas will continue to burn until the supply of gas is terminated. The burner 38, which is situated in combustion chamber 43, may be in fluid communication with an exhaust outlet, such as a flue 46. The flue 46 may be coupled to a vent pipe (not shown) that vents combustion gases exiting from the combustion chamber 43 to the atmosphere (e.g., outside of the building).

In an alternative water heater approach (not shown), the heat output may be controlled by an electric current flow through a resistive heating element. To produce heat in an electric heater, the amount of current provided through the resistive heating element may be regulated. In regulating the heat output, the more current impressed on the electric heating element, the more heat is produced. Conversely, less or no heat is produced if the current is reduced or turned off, respectively.

The water heater 10 includes a sensor 44. Sensor 44 may be a temperature sensor, or another device capable of sensing a measure of water temperature at or near the bottom of tank 12. In another approach, sensor 44 may be located towards bottom surface 36 and towards the exit of dip tube 24. Sensor 44, however, need not be located in such position, provided that sensor 44 is able to sense the water temperature at or near the bottom of tank 12. In other approaches, sensor 44 may be located in a position to sense the water temperature at any location within the tank 12, as desired.

In the approach, sensor 44 may provide a signal representing detected water temperature values to controller 20. Controller 20 may receive signals from sensor 44, and may, in response to these signals, produce an output to initiate, maintain and/or terminate a heating cycle. During a heating cycle, controller 20 may, for example, regulate gas flow to burner 38 or electric current to a resistive heating element (not shown). When gas is supplied to burner 38, controller 20 may instruct or trigger ignition source 40 to ignite the gas, if ignition source 40 requires such trigger. Burner 38 then burns the gas until the demand for heat ceases.

In the approach of FIG. 1, once the heat demand ceases, controller 20 may shut off the gas supply, thereby extinguishing burner 38. For some cases, controller 20 may modulate the flow of gas to burner 38 to thereby modulate the heat output of burner 38. If water heater 10 is instead electrically heated, it will be recognized that controller 20 may control the heating cycle of the one or more electrical heating elements.

Controller 20 may control the heater 18 (e.g., activate, maintain, terminate, etc.) according to a temperature set point. In some cases, the set point may be a normal temperature set point that is user adjustable, such as, for example, via a control knob (not shown). When the controller 20 detects a water temperature in the tank 12 below the normal temperature set point, controller 20 can activate the heater 18.

In some approaches, controller 20 may include a differential value. In these approaches, controller 20 can activate the heater 18 when the water temperature is below the set point minus the differential. Controller 20 can then terminate the heating cycle when the water temperature reaches the set point. In this approach, controller 20 can control the water temperature with the range of the normal temperature set point minus the differential to the set point.

In one example case, the normal temperature set point may be, for example, 135 degrees Fahrenheit (F) and the differential may be 10 degrees. In this example case, the controller 20 may activate the heater 18 to initialize a heating cycle when the water temperature of the tank falls below 125 degrees Fahrenheit and may terminate the heating cycle when the temperature reaches 135 degrees Fahrenheit. However, any suitable normal temperature set point and differential may be used, as desired.

In one alternative approach, controller 20 may include multiple set points. For example, controller 20 may initiate a heating cycle with a first, lower set point and may terminate the heating cycle with a second, higher set point, if desired.

Figure 2:
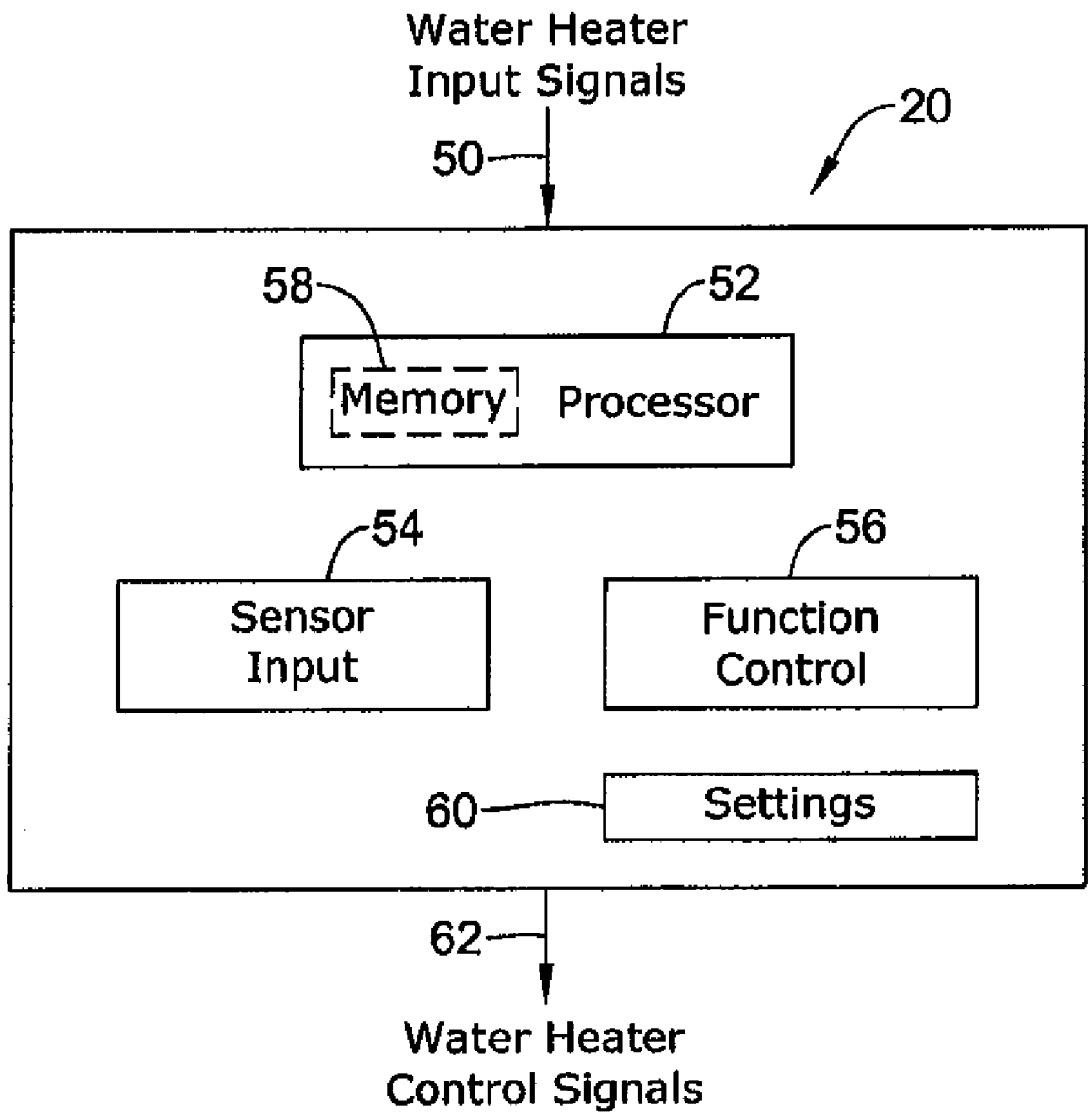
FIG. 2 is a block diagram of an illustrative controller for the water heater of FIG. 1.

FIG. 2 is a block diagram of the controller 20 for operating and/or controlling the water heater 10. The controller 20 includes a sensor input block 54, a function control block 56, a processing block 52, a memory block 58, and a settings block 60. The functions of the controller 20 may be implemented in hardware, software or a combination thereof. Under some circumstances, the sensor input block 54, the function control block 56, the processing block 52, the memory block 58, and/or the settings block 60 may be integrated on a single device platform, but this is not required.

The controller 20 may control the operation of the water heater 10. For example, the controller 20 may control the ignition source or pilot of the water heater, control the opening and closing of a gas valve, control the opening and closing of an optional flue damper (not shown), control the set point of the water in the tank, and/or control the operation of other components, depending on the application. The controller 20 may provide one or more water heater control signals, as shown at 62, to various components of the water heater 10, and may receive one or more water heater input signals 50 from water heater 10, such as one or more sensor (e.g., temperature sensor 44) input signals, one or more user interface input signals, and so forth.

The processing block 52 of the controller 20 may, in some cases, process one or more of the input signals 50, and in response, provide appropriate control signals 62 to the various water heater 10 components, sometimes through the function control block 56. For example, and in some cases, the function control block 56 may be adapted to control the ignition of the burner and/or the ignition source by either allowing ignition of the water heater 10 or not allowing ignition of the water heater 10. It is contemplated that the processing block 52 may include a microprocessor, but this is not required.

The controller 20 also includes a settings block 60 that may permit a user to input various parameters. Settings block 60 may be in communication with a control knob, a keypad or any other input devices, depending on the application. If, for example, controller 20 is being used with a water heater 10, settings block 60 may accept a user-defined normal temperature set point from a control knob or the like.

The sensor input block 54 may be in communication with and, in some cases, coupled to one or more sensors, such as temperature sensor 44 (shown in FIG. 1). Sensor input block 54 can receive a signal from the sensor 44 corresponding to the temperature of the water in the tank. The sensor input block 54 may be internal or coupled to the processing block 52 of the controller 50, if desired. Under some circumstances, the sensor input block 54 may be a sensing circuit, which may provide an electrical signal to the processing block 52 that indicates the temperature of the water in the tank.

Memory block 58 may be in communication with and, in some cases, coupled to the processing block 52. In some cases, memory block 58 may be internal to the processing block 52, but this is not required. Memory block 58 may include RAM, ROM, Flash memory, or any other suitable memory, as desired. In some cases, memory block 58 may store values corresponding to a normal temperature set point, a set point differential, a set point offset, a set point recovery offset, a burn recovery delay, an offset recovery time delay, a burn recovery time, an offset recovery time, a burn recovery step, an offset recovery time step, and/or other preset and/or real time values, as desired.

In operation, processing block 52 may be able to determine if stacking is likely to be occurring in the water heater tank. To determine if stacking is likely to be occurring, and in one approach, processing block 52 may determine the rate of change of the water temperature in the tank adjacent to the sensor. For example, to determine the rate of change of the water temperature adjacent to the sensor, the controller 20 may receive a first signal from the sensor via sensor input block 54 corresponding to the water temperature at a first time. In some cases, the water temperature and the time may be stored in memory 58, but this is not required. Then, after a period of time, controller 20 may receive a second signal from the sensor via sensor input block 54 corresponding to the water temperature at a second time. Using the change in the water temperature and the time difference between the two temperatures, processing block 52 may be able to determine the rate of change of the water temperature adjacent to the sensor in the water heater tank. In some cases, controller 20 may also determine and use a change in the rate of change of the water temperature adjacent to the sensor in the water heater tank, but this is not required.

To determine if stacking is occurring in the water heater tank, processing block 52 may compare the rate of change of the water temperature to a stacking rate of change threshold value (or other value). If the rate of change of the water temperature exceeds the stacking rate of change threshold value, the processing block 52 may determine that stacking is likely to occur in the water heater tank. This is likely to occur when, for example, a number of short water draws are made from the water tank.

In some cases, the stacking rate of change threshold value may be a preset value, a computed value, a user defined value, or any other value, as desired. In some cases, the stacking rate of change threshold value may be any value from, for example, 0.1 degrees Fahrenheit per second to 10 degrees Fahrenheit per second. In one case, the stacking rate of change threshold value may be 0.25 degrees Fahrenheit per second. It is contemplated, however, that this is only an example, and that the stacking rate of change threshold value may be any suitable value, depending on the application.

When processing block 52 determines that stacking is likely occurring, processing block 52 may adjust the normal temperature set point by an offset value. In some cases, the controller 20 may control to a new set point that may be defined as the normal user-defined temperature set point minus the offset. In this case, when stacking is not detected by controller 20, the offset may be equal to zero. However, it is contemplated that a stacking set point value may be stored in memory based on the normal user-defined temperature set point and when stacking is likely to be present, the controller may refer to the stored stacking set point value.

In some cases, the offset value may be a preset value, a user defined value, or a variable value determined by the rate of change of the water temperature, as desired. In some cases, the offset may be from 1 degree to 20 degrees, as desired. In one case, the offset may be 9 degrees. In some cases, the offset value may be formula based on, for example, the water temperature differential minus a value. However, it is contemplated that any suitable offset may be used, as desired. Furthermore, it is contemplated that the set point may be defined as the normal user-defined temperature set point plus the offset. In this case, the offset would be a negative value under many operating conditions.

During subsequent operation of the water heater, processing block 52 may control the operation of the water heater, such as, ignition of the burner and/or ignition source via function block 56, using the adjusted set point (e.g., the normal user defined temperature set point minus the offset).

Controller 20 may also determine if it is likely that the water heater tank has sufficiently recovered from stacking. For example, the processing block 52 may monitor the time that the burner is activated or deactivated during subsequent heating cycles. In some cases, if the burner "on" time exceeds a burner on recovery time or, in other cases, if the burner off time exceeds a burner off recovery time, then the processing block 52 may determine that the tank is likely to have recovered from stacking. Processing block 52 may then adjust the offset (decrease the offset if positive or increase the offset if negative) by a recovery offset value during each subsequent heating cycle until the offset value is zero. In some cases, the recovery from stacking may be performed in multiple iterations gradually adjusting the offset toward the normal user-defined temperature set point.

Figure 3:
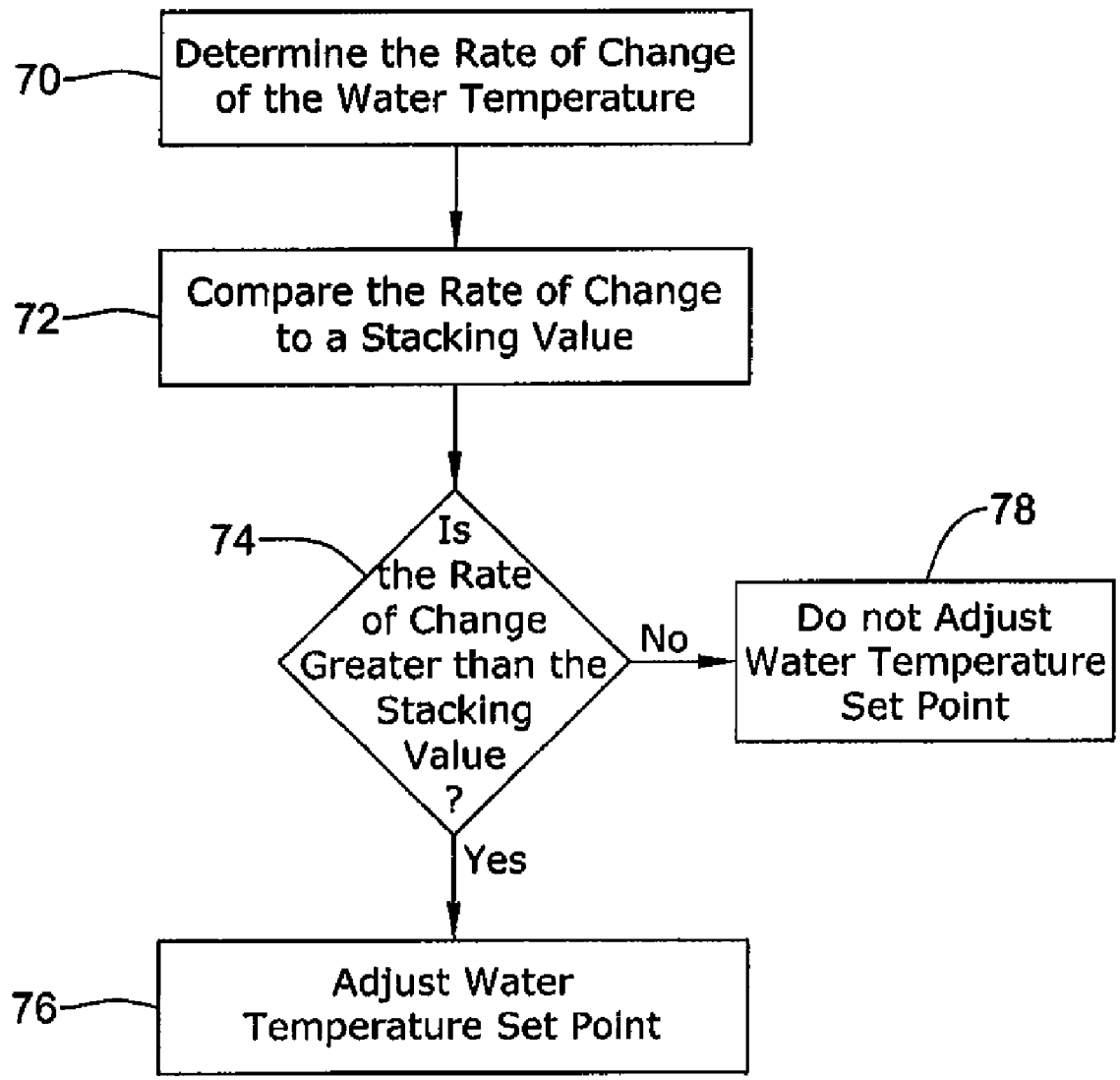
FIG. 3 is a flow diagram of an illustrative approach for detecting stacking in the water heater of FIG. 1.

FIG. 3 is a flow diagram of an illustrative approach for detecting stacking in the water heater of FIG. 1. In block 70, the controller may determine the rate of change of the water temperature in the tank of the water heater. In some cases, the rate of change of the water temperature in the tank may be the rate of change of the water temperature in the tank adjacent to the sensor 44, which, in some cases, may be positioned towards the bottom end of the tank. In one example approach of determining the rate of change of the water temperature, the controller may receive a first signal from the sensor corresponding to the water temperature at a first time. In some cases, this water temperature and time may be stored in memory, but this is not required. Then, after a period of time, controller may receive a second signal from the sensor corresponding to the water temperature at a second time. Using the change in the water temperature from the first signal to the second signal along with the period of time between the first signal and the second signal, the controller may determine the rate of change of the water temperature adjacent to the sensor in the water heater tank. It is contemplated, however, that the controller may use any suitable approach of determining a rate of change of the water temperature in the water tank, as desired. For example, the controller may determine the difference in temperature between the first signal from the sensor and the second signal of the sensor, and then compare that difference to the stacking rate of change threshold value multiplied by the time difference between the first signal and the second signal, if desired. Moreover, and in some embodiments, controller 20 may also determine and use a change in the rate of change of the water temperature adjacent to the sensor in the water heater tank, but this is not always required.

In block 72, the controller may compare the rate of change to a stacking rate of change threshold value. In some cases, the stacking rate of change threshold value may be 2 degrees Fahrenheit per second, 1.5 degrees Fahrenheit per second, 1 degree Fahrenheit per second, 0.75 degrees Fahrenheit per second, 0.5 degrees Fahrenheit per second, or 0.25 degrees Fahrenheit per second. These are only illustrative, and it is contemplated that another suitable stacking rate of change threshold value may be used, as desired.

In decision block 74, the controller may determine if the rate of change of the water temperature is greater than the stacking rate of change threshold value. If the rate of change of the water temperature exceeds the stacking rate of change threshold value, then it is determined that stacking is likely to be occurring, and, as indicated in block 76, the controller may adjust the water temperature set point (e.g., increase the offset). For example, if the normal user-defined temperature set point is 135 degrees Fahrenheit, then the controller may adjust the offset to be 9 degrees. In this example case, the adjusted set point would be 126 degrees Fahrenheit (i.e., 135 degrees Fahrenheit minus 9 degrees Fahrenheit).

If, however, the rate of change of the water temperature does not exceed the stacking rate of change threshold value, as determined in decision block 74, then the controller may determine that an insufficient or harmless amount of stacking is likely occurring. Then, as indicated in block 78, the controller need not adjust the water temperature set point (e.g., not adjust the offset).

Figure 4:
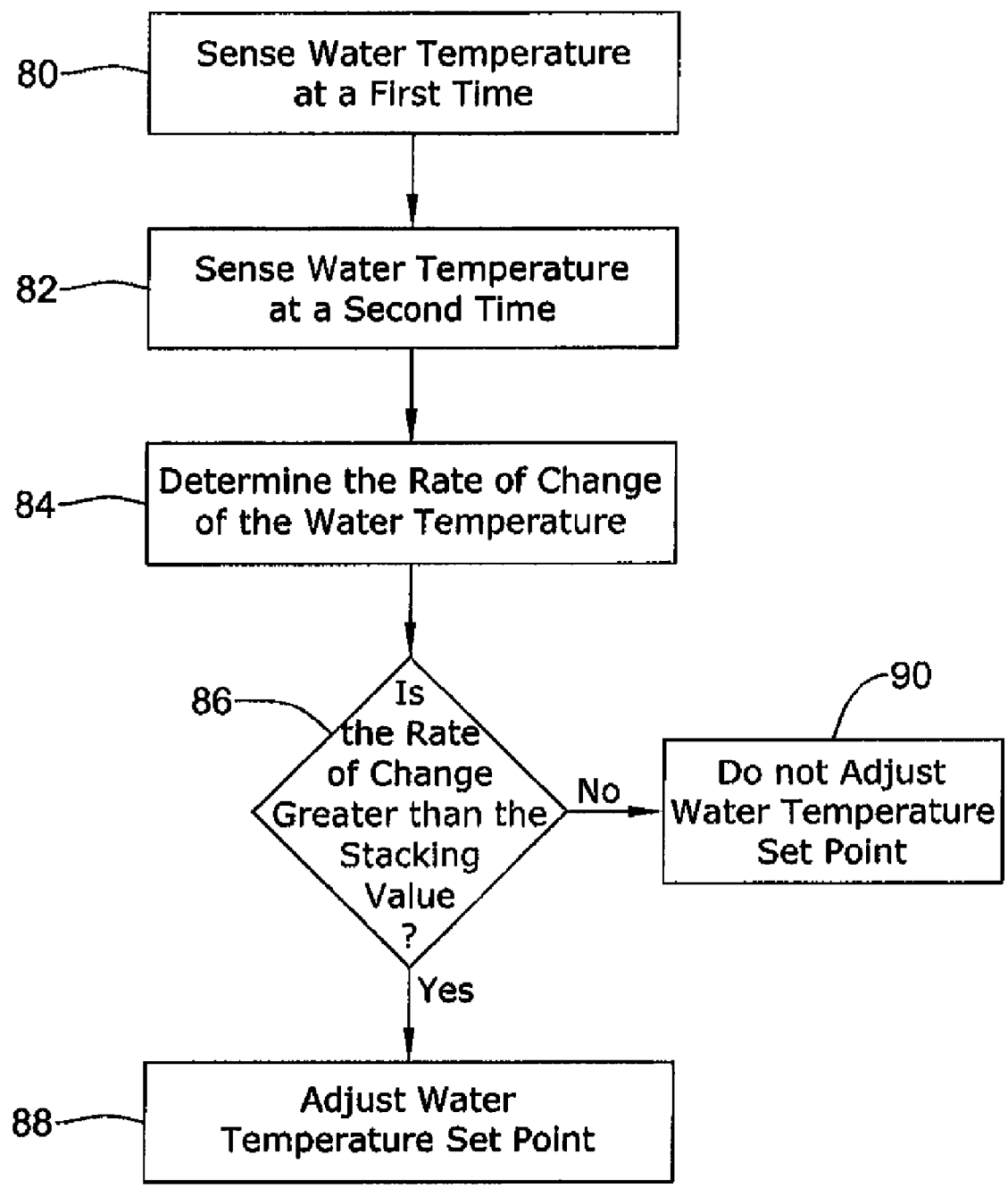
FIG. 4 is a flow diagram of an illustrative approach for detecting stacking in the water heater of FIG. 1.

FIG. 4 is a flow diagram of an illustrative approach for detecting stacking in the water heater of FIG. 1. In block 80, controller may receive a first signal from the sensor corresponding to the water temperature at a first time. In some cases, this water temperature and time may be stored in memory, but this is not required. Then, in block 82, controller may receive a second signal from the sensor corresponding to the water temperature at a second time. In some cases, this water temperature and time may be stored in memory, but this is not required.

Next, in block 84, the controller may determine the rate of change of the water temperature in the tank. To do this, and in some embodiments, the controller may determine the difference between the temperature of the water from the first signal and the temperature of the water from the second signal. To get the rate of change, the controller may divide this difference by the difference in time between the two signals. However, it is contemplated that the controller may use any suitable approach of determining the rate of change of the water temperature, as desired. For example, it is contemplated that controller may determine the difference in temperature between the first signal from the sensor and the second signal of the sensor, and then compare that difference to the stacking rate of change threshold value multiplied by the time difference between the first signal and the second signal, if desired.

In decision block 86, the controller can compare the rate of change of the water temperature to a stacking rate of change threshold value. In some cases, the stacking rate of change threshold value may be 2 degrees Fahrenheit per second, 1.5 degrees Fahrenheit per second, 1 degree Fahrenheit per second, 0.75 degrees Fahrenheit per second, 0.5 degrees Fahrenheit per second, or 0.25 degrees Fahrenheit per second. It is contemplated, however, that any suitable stacking rate of change threshold value or other value may be used, as desired.

If the rate of change of the water temperature is greater than the stacking rate of change threshold value, then, in block 88, the controller may adjust the water temperature set point (e.g., adjust the offset). If, however, the rate of change of the water temperature is not greater than the stacking rate of change threshold value, then, in block 78, the controller need not adjust the water temperature set point (e.g., does not adjust the offset).

Figure 5:
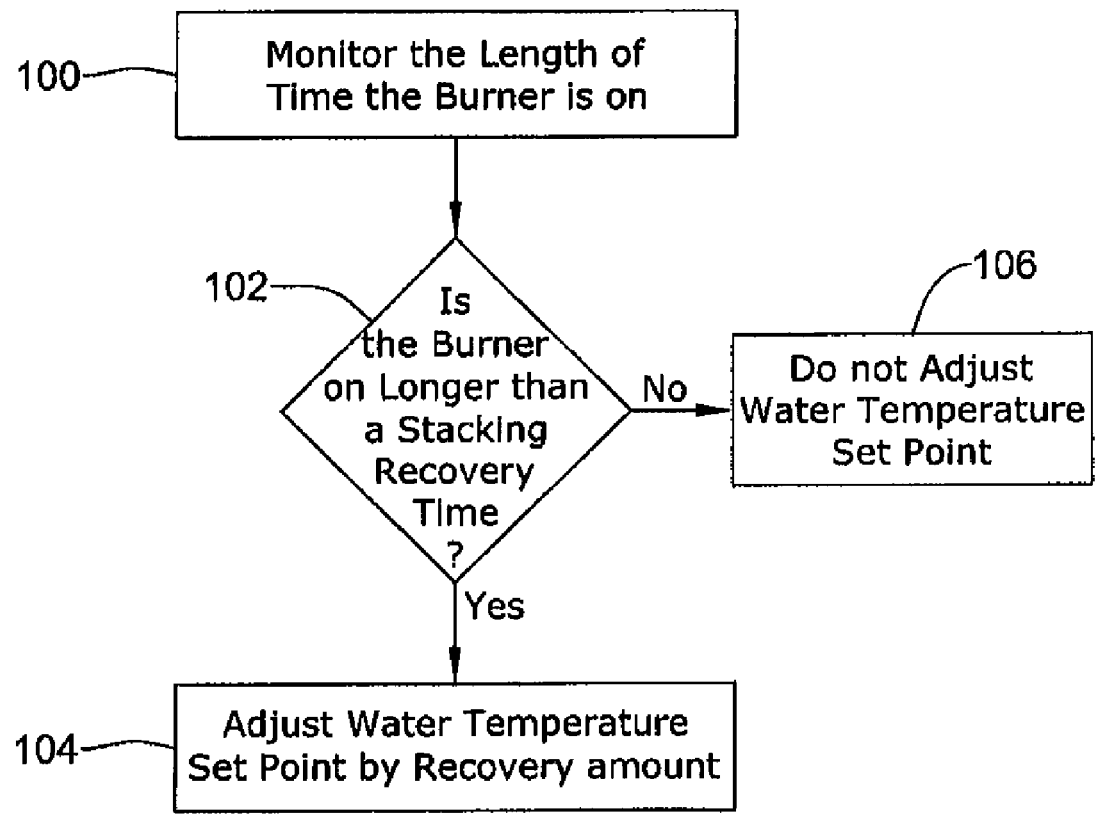
FIG. 5 is a flow diagram of an illustrative approach of recovering from stacking in the water heater of FIG. 1.

FIG. 5 is a flow diagram of an illustrative approach of recovering from stacking in the water heater of FIG. 1. After the controller has detected that stacking is likely occurring in the water heater, and has adjusted the offset to be non-zero, the controller may monitor the water heater tank to determine when the effects of stacking likely have dissipated. This illustrative approach may provide a way of recovering from stacking.

In block 100, the controller may monitor the length of time that the burner has been on during a subsequent heating cycle. In some cases, the controller, such as the processing block of the controller, may include a clock or timer that may be able to monitor and/or count the time that the burner has been activated.

Next, in decision block 102, the controller may determine if the burner has been activated for a period of time that is greater than a burner on (stacking) recovery time. In some cases, the burner on recovery time may be a value stored in the memory block of the controller, but this is not required. In some cases, the burner on recovery time may be in the range of 100 seconds to 100,000 seconds. In one illustrative example, the burner on stacking recovery time may be 3,600 seconds. It is contemplated, however, that the burner on stacking recovery time may be any suitable period of time, depending on the application.

If the burner has been activated for a period of time that is greater than the burner on recovery time, then, in block 104, the controller may adjust the water temperature set point (e.g., offset) by a burner on recovery offset step. In some cases, the burner on recovery offset step may be a value less than the offset. However, it is contemplated that any suitable burner on recovery offset step may be used, as desired. For example, if the offset value of 9 is stored in memory after stacking was detected, the burner on recovery offset step may adjust the offset towards zero in incremental steps, such as, for example, 3 degree steps. In this example case, the offset would be adjusted to 6 degrees during each successive heating cycle. One may generally continue to increment towards the user set point—one may easily make it all the way back to the set point. It is contemplated that the offset may be adjusted to recover from stacking in a single step (e.g., set offset to zero), or in any other manner, as desired.

If the burner has not been activated for a period of time that is greater than the burner on recovery time, then, in block 106, the controller need not adjust the set point (e.g., does not adjust the offset), or in some cases, may increase the offset such as in 3 degree steps to a maximum offset of 9 degrees. In some cases, the controller may continue to run this control sequence during subsequent heating cycles, until the offset is zero.

Figure 6:
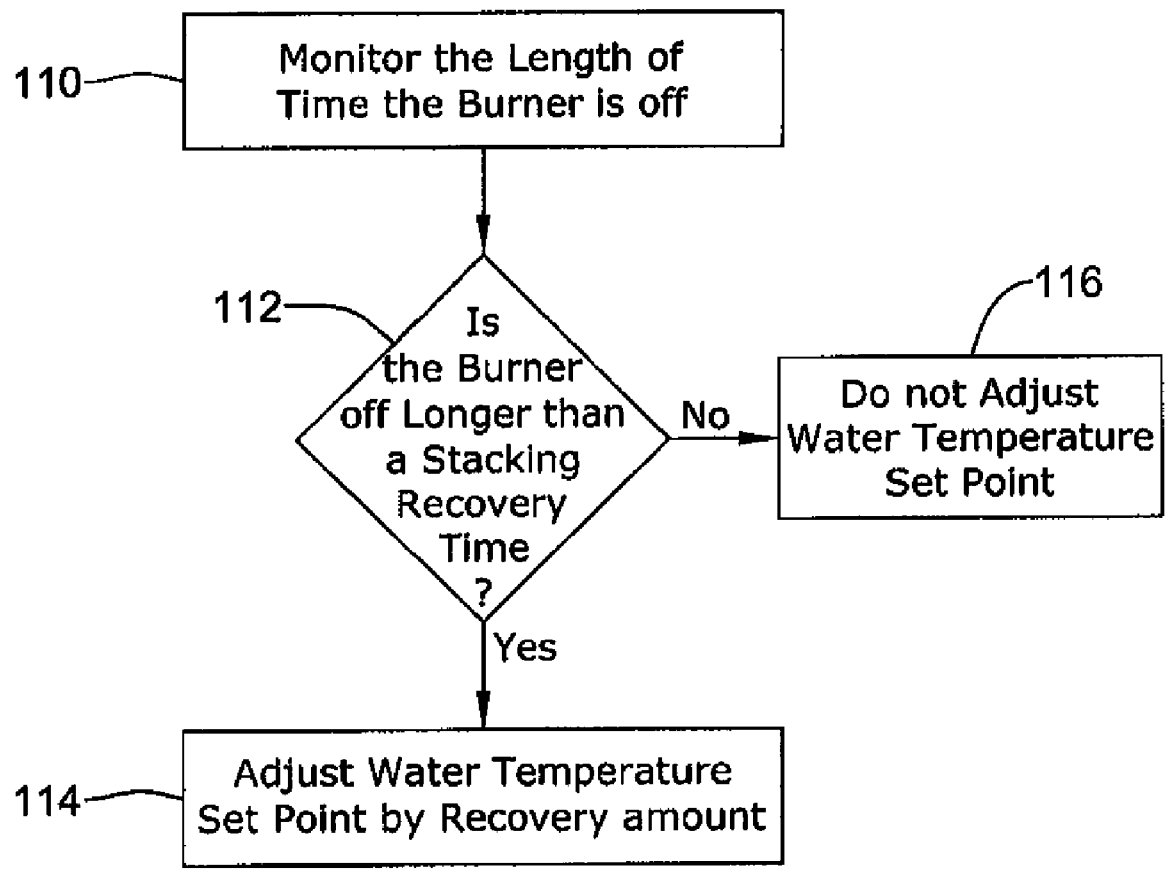
FIG. 6 is a flow diagram of an illustrative approach of recovering from stacking in the water heater of FIG. 1.

FIG. 6 is a flow diagram of an illustrative approach of recovering from stacking in the water heater of FIG. 1. After the controller has detected that stacking is likely in the water heater, and adjusted the set point (e.g., adjust the offset to be non-zero), the controller may monitor the water heater tank to determine when the effects of stacking likely have dissipated.

This illustrative approach may provide a way of recovering from stacking during subsequent heating cycles.

In block 110, the controller may monitor the length of time that the burner is off between successive heating cycles. In some cases, the controller, such as the processing block of the controller, may include a clock or timer that may be able to monitor and/or count the time that the burner has been off/deactivated.

Next, in decision block 112, the controller may determine if the burner has been off for a period of time greater than a burner off (stacking) recovery time. In some cases, the burner off recovery time may be in the range of 100 seconds to 100,000 seconds. In one illustrative example, the burner off recovery time may be 900 seconds. It is contemplated, however, that the burner off recovery time may be any period of time, as desired.

If the burner has been off for a period of time greater than the burner off recovery time, then, in block 114, the controller may adjust the water temperature set point (e.g., offset) by a burner off recovery offset or step. In some cases, the burner off recovery offset may be a value less than the offset. For example, if the offset value of 9 was stored in memory after stacking was detected, the burner off recovery offset may adjust the offset towards zero in incremental steps, such as, for example, 3 degree steps. In this example case, the offset would be adjusted to 6 degrees during a first iteration. It is also contemplated that the offset may be adjusted to recover from stacking in a single step (e.g., set offset to zero), if desired.

If the burner has not been off for a period of time greater than the burner off recovery time, then, in block 116, the controller need not adjust the set point (e.g., does not adjust the offset), or in some cases, may increase the offset such as in 3 degree steps to a maximum offset of 9 degrees. In some cases, the controller may continue to run this control sequence during subsequent heating cycles, until the offset is zero.

Figure 7:
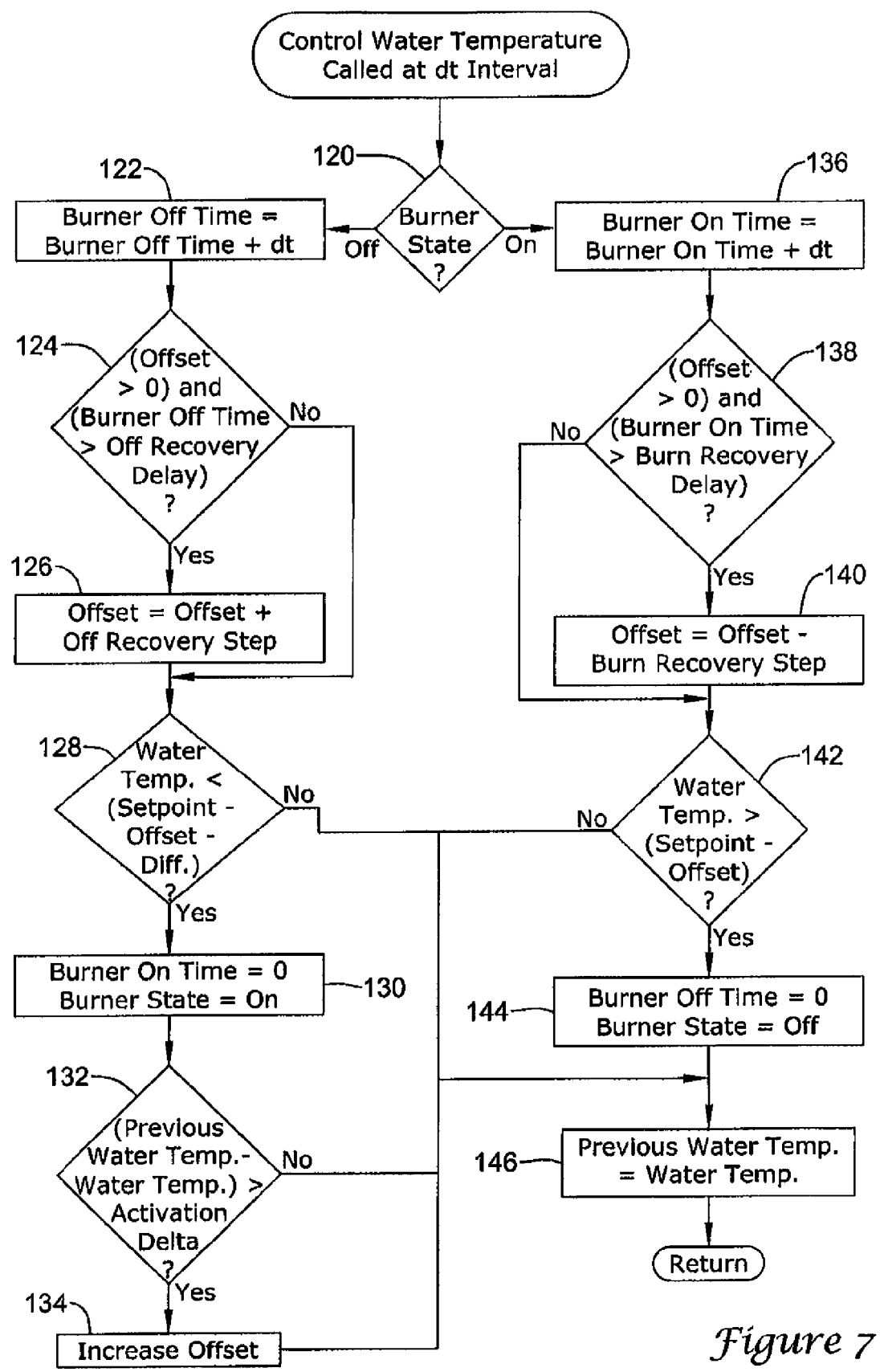
FIG. 7 is a flow diagram of an illustrative approach of operating the water heater of FIG. 1.

FIG. 7 is a flow diagram of an illustrative approach of operating the water heater of FIG. 1. The illustrative approach can provide for the detection of likely stacking in the tank, limiting stacking, and recovering from such stacking. In some cases, the illustrative control sequence may be called or executed at intervals of time, indicated as "dt". In some cases, the interval of time may be on the order of tens of seconds, seconds, tenths of seconds, or any other suitable time interval, as desired. In one illustrative embodiment, the interval of time may be 1 second.

Each time the control sequence is called, in decision block 120, the controller determines the state of the burner (e.g., on or off). If the burner is off, then the illustrative control sequence moves to block 122. If the burner is on, the illustrative control sequence moves to block 136.

When the burner is off, and in block 122, the controller may initially increment the period of time that the burner has been off, indicated as BurnerOffTime. In the illustrative case, the BurnerOffTime may be incremented by the interval "dt" (e.g., 1 second). In some cases, BurnerOffTime may be stored in the memory of the controller.

Next, in decision block 124, the controller may determine if the present offset is greater than zero and the BurnerOffTime is greater than the burner off recovery time, indicated as OffRecoveryDelay. In some cases, the burner off recovery time may be in the range of 100 seconds to 100,000 seconds. In one illustrative example, the burner off recovery time may be 900 seconds, but it is contemplated that any suitable burner off recovery time may be used, as desired.

If the offset is greater than zero and the BurnerOffTime is greater than the OffRecoveryDelay, then, in block 126, the controller decreases the offset by the burner off recovery offset, indicated as OffRecoveryStep. In some cases, the burner off recovery offset may be a value that is less than the offset, but this is not required. For example, it is contemplated that the OffRecoveryStep may be equal to the offset to adjust the offset to zero during a single iteration, if desired. If the offset is not greater than zero or the BurnerOffTime is not greater than the OffRecoveryDelay, then the illustrative control sequence moves to block 128 and does not decrease the offset.

In decision block 128, the controller determines if the present water temperature, indicated as WaterTemperature, is less than the normal user-defined temperature set point, indicated as Setpoint, minus the offset minus the differential. If WaterTemperature is not less than Setpoint minus the offset minus the differential, then the illustrative control sequence moves to block 146 and stores the present water temperature as PreviousWaterTemperature for use in the next iteration of the control sequence.

If WaterTemperature is less than the set point minus the offset minus the differential, then the control sequence moves to block 130. In block 130, the time that the burner has been on, indicated as BurnerOnTime, is set to zero and the burner is turned on, indicated by BurnerState= on.

After the burner has been turned on, in decision block 132, the controller may be able to determine if stacking is likely to be occurring in the water heater tank. The controller may, for example, determine if the PreviousWaterTemp minus the WaterTemperature is greater than the stacking rate of change threshold multiplied by the time interval, indicated as ActivationDelta. The time delta, dt, provides the time difference between when the PreviousWaterTemp measurement and the WaterTemperature measurement were taken. If the PreviousWaterTemp minus the WaterTemperature is not greater than ActivationDelta, then the control sequence may move to block 146, as discussed previously. If the PreviousWaterTemp minus the WaterTemperature is greater than ActivationDelta, then, in block 134, the controller can increase the offset. In some cases, the offset may be increased by a preset value. In one case, for example, the offset may be increased by 9 degrees. However, any suitable offset increase may be used, as desired. Then, after the offset has been increased, the control sequence may move to block 146, where the PreviousWaterTemp is set equal to the present WaterTemperature value for use during the next iteration.

Referring back to block 120, when the burner is on, and in block 136, the controller may initially increment the period of time that the burner has been on, indicated as BurnerOnTime. In the illustrative embodiment, the BurnerOnTime may be incremented by the iteration interval "dt". In some cases, the BurnerOnTime may be stored in the memory of the controller.

Next, in decision block 138, the controller may determine if the offset is greater than zero and the BurnerOnTime is greater than the burner on recovery time, indicated as BurnRecoveryDelay. In some cases, the burner on recovery time may be in the range of 100 seconds to 100,000 seconds. In one illustrative example, the burner on recovery time may be 3,600 seconds, but it is contemplated that the burner on recovery time may be any suitable period of time, as desired.

If both the offset is greater than zero and the BurnerOnTime is greater than the BurnRecoveryDelay, then, in block 140, the controller decreases the offset by the burner on recovery offset, indicated as BurnRecoveryStep. In some cases, the burner on recovery offset may be a value that is less than the offset, but this is not required. For example, it is contemplated that the BurnRecoveryStep may be equal to the offset to adjust the offset to zero during a single iteration, if desired. If either the offset is not greater than zero or the BurnerOnTime is not greater than the BurnRecoveryDelay, then the offset need not be decreased. Control is then passed to block 142.

In decision block 142, the controller determines if the present water temperature, indicated as WaterTemperature, is greater than the normal user-defined temperature set point, indicated as Setpoint, minus the offset. If WaterTemperature is not greater than Setpoint minus the offset, then the control sequence moves to block 146 and stores the present water temperature as PreviousWaterTemperature for the next iteration of the control sequence.

If WaterTemperature is greater than the Set point minus the offset, then the control sequence moves to block 144. In block 144, the time that the burner has been off, indicated as BurnerOffTime, may be set to zero and the burner may be turned off, as indicated by BurnerState=off.

The illustrative control sequence may be repeated. For example, the control sequence may be run at intervals of time, namely "dt", which, in some cases, may be on the order of tenths of seconds, seconds, tens of seconds, or at any other interval as desired.

The illustrative control sequence of FIG. 7 has been described with reference to an offset value that is positive, or where the set point is defined by the normal user-defined temperature set point minus the offset. It is contemplated that, in some cases, the offset may be a negative value where the set point is defined as the normal user-defined temperature set point plus the offset. Also, it is contemplated that a separate control set point may be calculated and used by the controller during stacking conditions. For example, a separate stacking control set point may be defined and set equal to the normal user-defined temperature set point plus/minus the offset, as desired.

The present invention may include another approach and several changes and/or additions to the approach indicated herein and in U.S. patent application Ser. No. 11/764,940, filed Jun. 19, 2007, which has the same assignee as the present application. The other approach and changes and/or additions may include, but not be limited to, a specific technique for the adjustment of a setpoint offset, and a use of heating rate to detect stacking and reduce setpoint to limit stacking. U.S. patent application Ser. No. 11/764,940, filed Jun. 19, 2007, is hereby incorporated by reference.

The present system includes an approach which may use a detection technique to determine if stacking occurs. If stacking is detected, then the setpoint may be lowered so that the outlet water temperature will be within the safe limit. If stacking is not detected, the setpoint may gradually be restored (i.e., reduce or remove offset) to optimize water heater capacity.

To recap, stacking may happen when water draw and heating fall into one of the following patterns. The first pattern may include frequent small to medium water draws and heating. A second pattern may include a long duration low to medium flow rate draw with long heating. It may be noted that deep water draws normally do not cause stacking after heating.

Some approaches may use a draw pattern detection technique to predict stacking build up, and adjust setpoint accordingly to limit outlet temperature within a safe range. The present approach may use a detection technique to note stacking. This stacking detection technique may be based on the water heater heating/cooling behavior and water draw timing.

One may consider the case with no water draw. When water temperature in a water tank is close to uniform and heater is on, the water in the tank may be heated nearly uniformly. If significant stacking exists in the tank, then the bottom water may be heated much faster than the top water. With a sensor mounted at the lower portion of the tank, the sensed heating rate may be faster than that when the water is close to uniform.

In another instance, one may consider low draw rate with continuous heating. In this case, the water heating rate may be very low. The cooling of the incoming cold water and the heating of the heater may balance out, leaving a dynamically balanced stacking in the tank. If the sensed temperature is close to the setpoint, the outlet water may be significantly higher.

Figure 8:
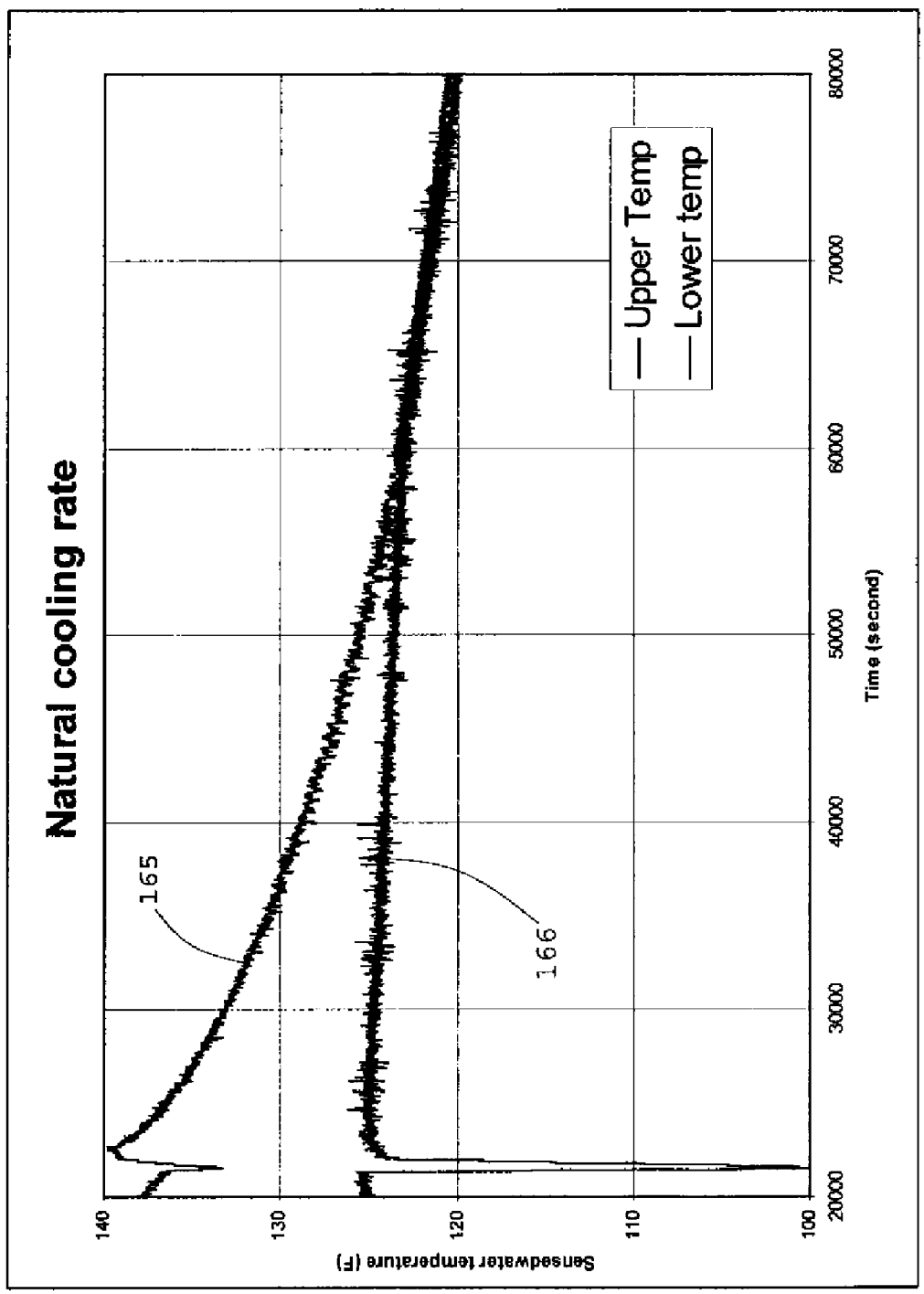
FIGS. 8-11 are diagrams of typical heating and cooling rates at various stacking conditions.
Figure 9:
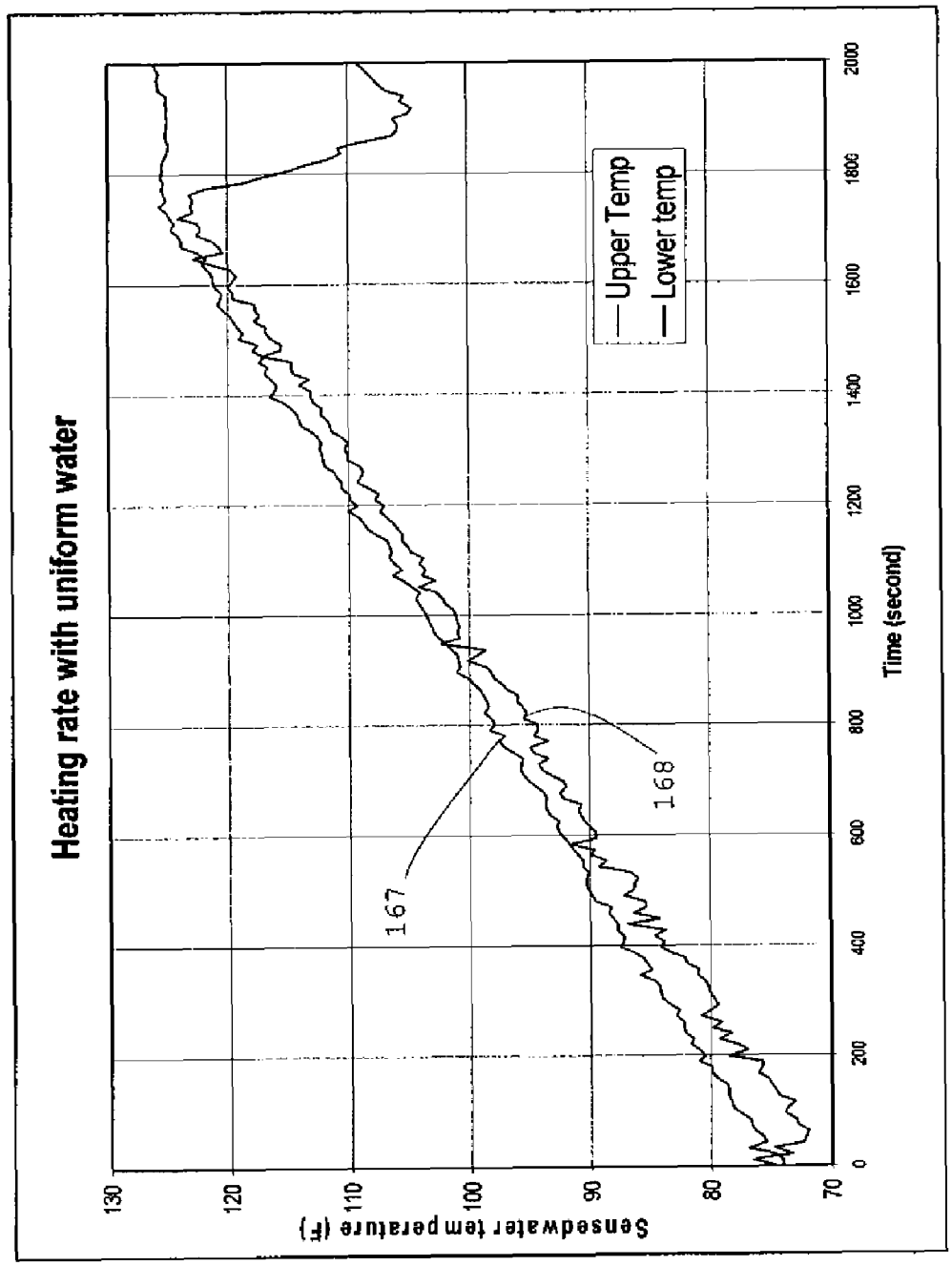
Figure 10:
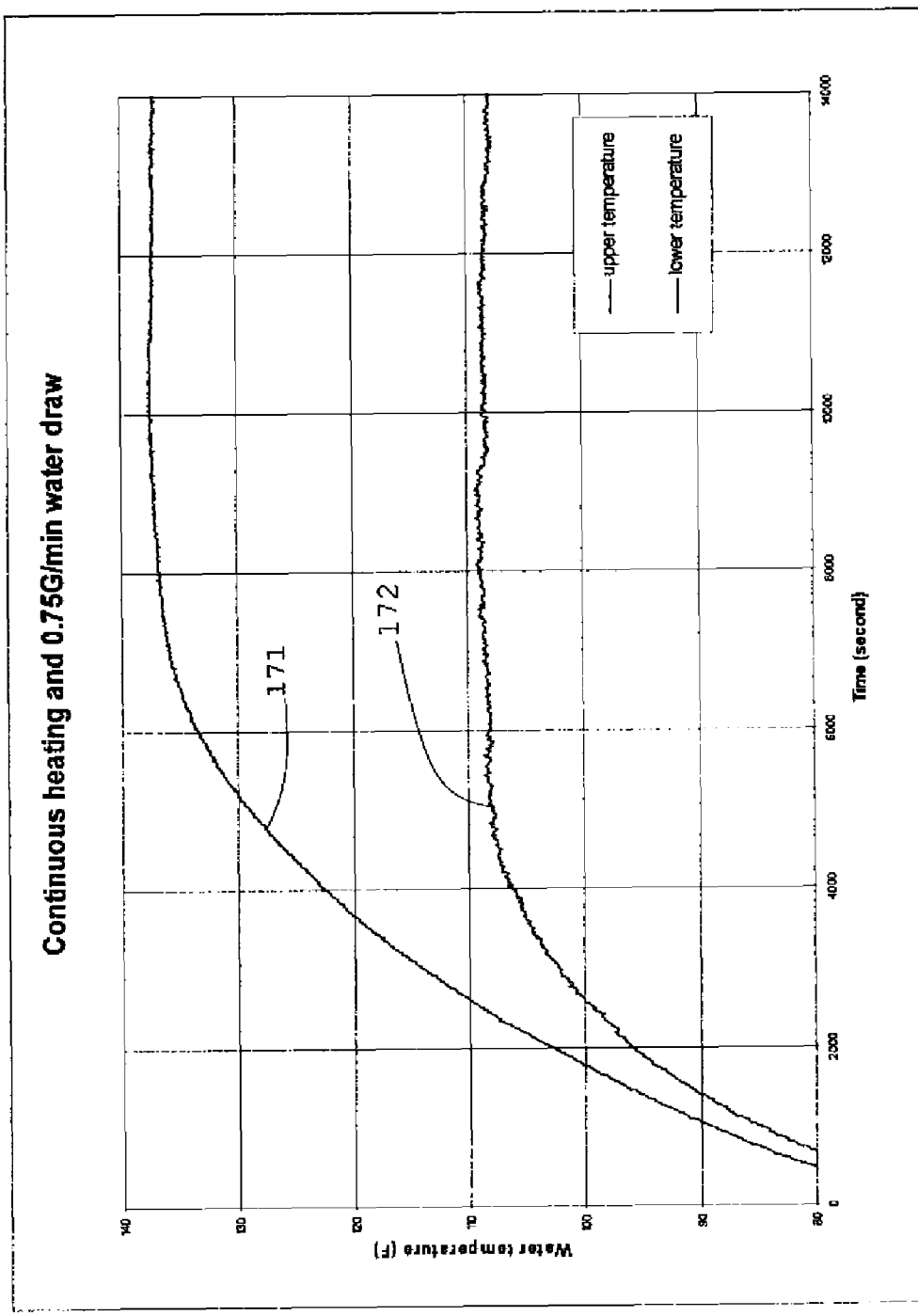
Figure 11:
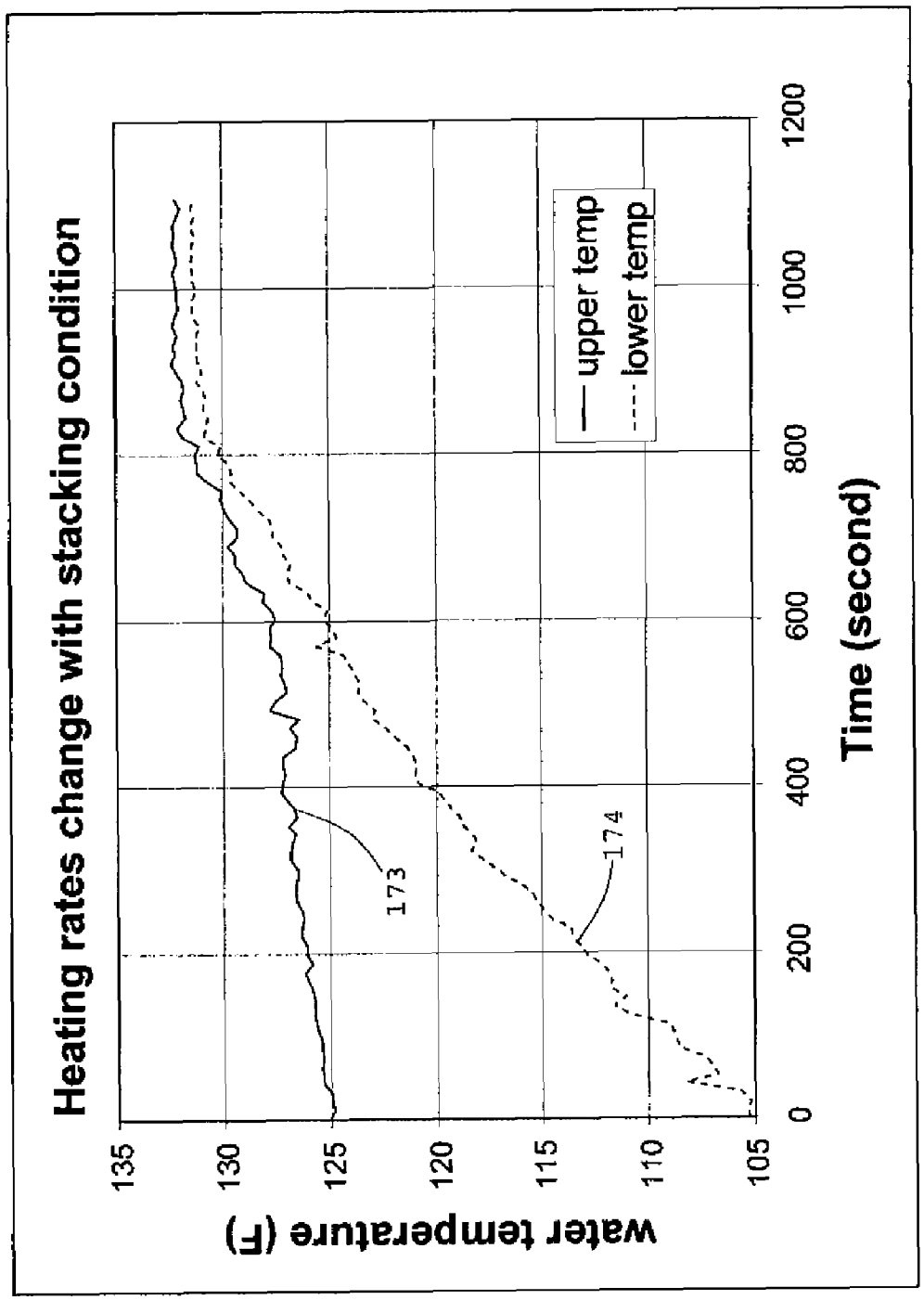

Typical heating and cooling rates at various stacking conditions are shown in graphs of FIGS. 8-11. The graphs show curves of water temperature in degrees Fahrenheit (F) versus time in seconds. FIG. 8 indicates the natural cooling rate with an upper temperature 165 and a lower temperature 166. With stacking, the upper temperature cools faster than the lower temperature. This Figure illustrates why the stacking offset, if non-zero, is adjusted towards the user set point during a long burner off time. FIG. 9 indicates a heating rate with uniform water. Here, the upper temperature 167 and the lower temperature 168 rise at about the same rate. FIG. 10 indicates continuous heating and a 0.75 gallon (G)/minute water draw for the nominally-sized water heater. With continuous water draw and heating, the water temperatures 171 and 172 at the upper and lower portions of the tank, respectively, approach a steady state, and a steady stacking is established. This situation is an example of when the algorithm must not adjust the offset closer to user set point. If the controller did so, then the top portion of the tank would be allowed to get even hotter possibly exceeding a maximum limit. FIG. 11 indicates that heating rates change with stacking condition. When heating starts with a large stacking, the heating rate at the lower part of the tank, as shown by the lower temperature 174, is noticeably higher than the heating rate at the upper part of the tank, as shown by the upper temperature 173. When stacking is reduced, then the heating rates are closer to each other. The differences seen here are used as previously described to detect stacking and adjust control parameters accordingly.

Figure 12:
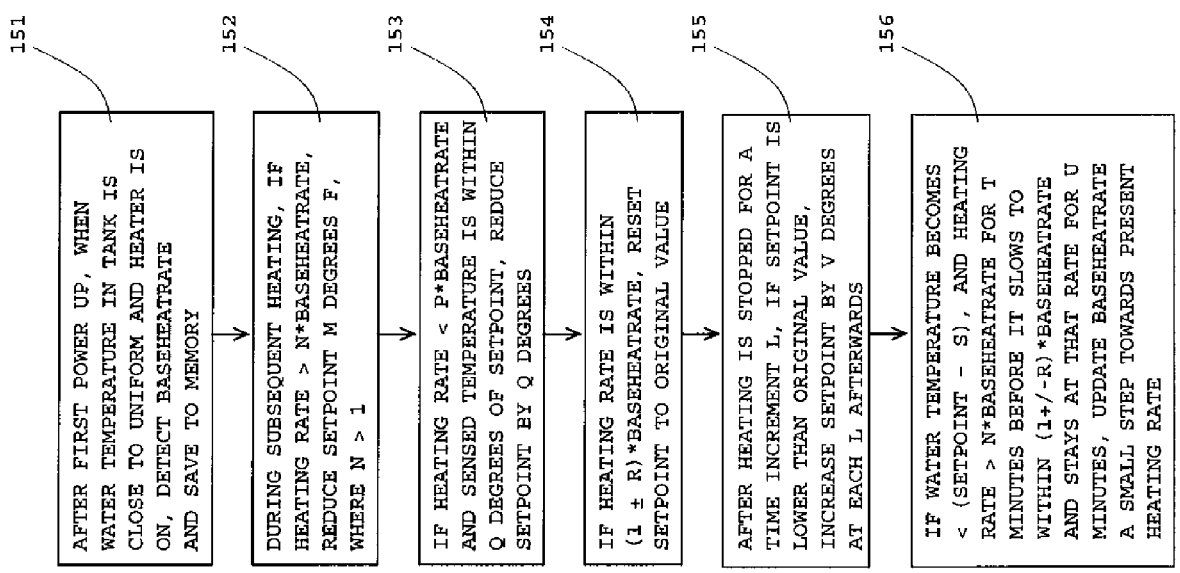
FIG. 12 is a diagram of a water heater temperature control approach for managing stacking.

The present control algorithm consists of the following items as shown in FIG. 12. In block 151, after a first power up, when the water temperature in the tank is close to being uniform and the heater is on, the basic heating rate (B) or base heat rate (BaseHeatRate) may be detected and saved to a non-volatile memory. B and BaseHeatRate may be regarded as the same rate. Other water temperature change rates may be referred to as to another heating rate. The illustrative examples of values noted herein may be of a typical nominally-sized standard water heater used by an ordinary residential consumer.

In block 152, during subsequent heating, if the heating rate>N*BaseHeatRate, then the setpoint may be reduced by M degrees, where N>1. An illustrative example of values may be N=1.5 and M=10 degrees F. The ranges of values for N and M may be about 1.5 to 2.5 and 5 to 30, respectively.

In block 153, if the heating rate<P*BaseHeatRate, and the sensed temperature is within Q degrees Fahrenheit of the setpoint, then the setpoint may be reduced by Q degrees. An illustrative example of values may include P=0.25 and Q=12. The ranges of values for P and Q may be about 0.1 to 0.4 and 5 to 30, respectively.

In block 154, if the heating rate is within (1±R)*BaseHeatRate, then the setpoint may be reset to the original value. An illustrative example of a value for R may be 0.2. The range of values for R may be about 0.1 to 0.3.

In block 155, after heating is stopped for a time increment or unit length of time (L or dt) such as one hour, and if the setpoint is lower than the original value, then the setpoint may be increased by V degrees every L such as every hour afterwards. The range of L for stopping the heating and increasing V may be about 0.25 to 2 hours. One illustrative example of a value for V may be 1.2. The range of values for V may be about 0.5 to 2.5.

In block 156, if the water temperature becomes less than (setpoint−S), which appears to indicate a deep draw, and the heating rate is greater than N*BaseHeatRate for T minutes before the rate slows down to within (1±R)*BaseHeatRate and stays at the (1±R)*BaseHeatRate for U minutes, then the BaseHeatRate may be updated with an incremental or small step towards the present heating rate. An illustrative example of values may include S=40 degrees F., T=4 and U=4. The ranges for S, T and U may be about 20 to 50, 1 to 8, and 1 to 8, respectively. Block 156 may allow the BaseHeatRate to be updated for any seasonal or aging effect of the heater, tank, and/or sensor changes.

Figure 13:
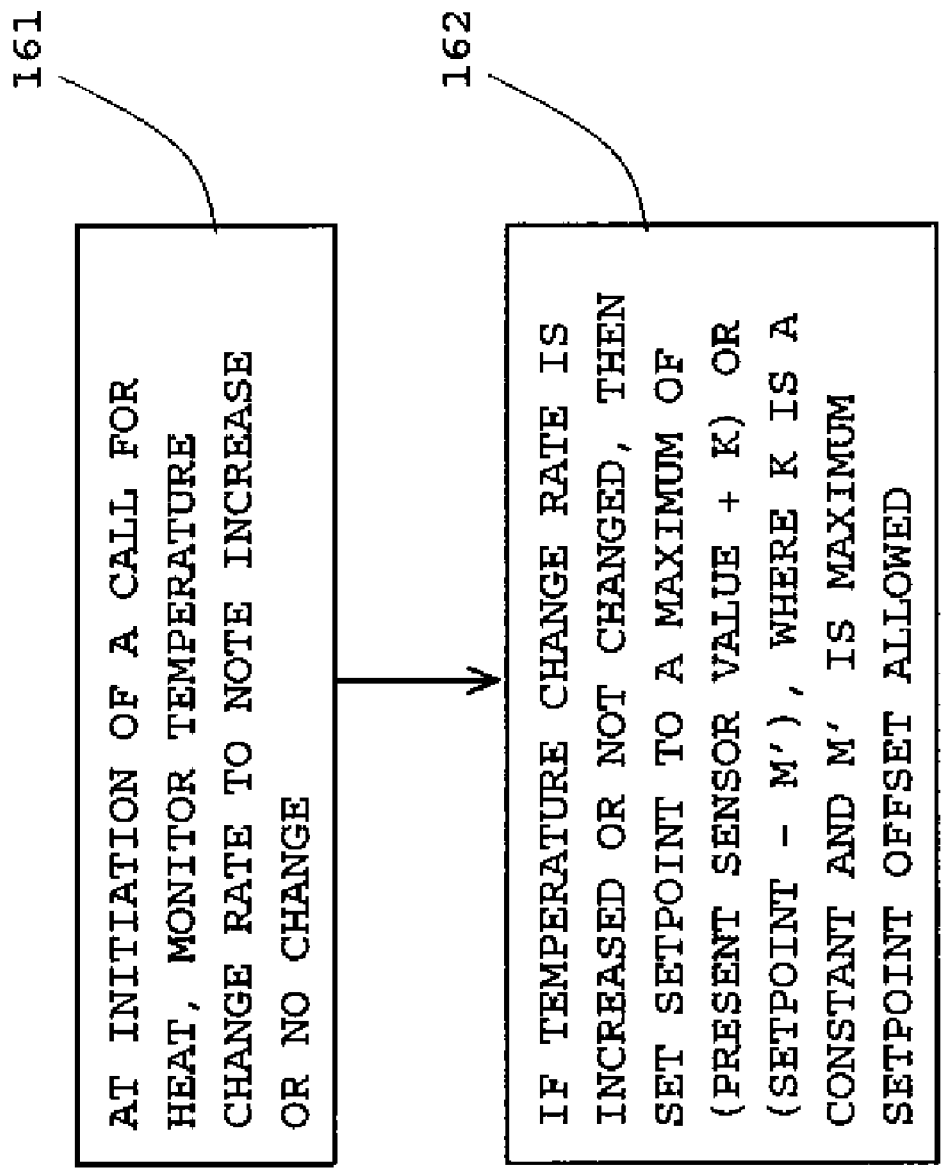
FIG. 13 is a diagram of another aspect of the approach for managing stacking.

Several items different from those of the approach in FIGS. 3-7 may be implemented as indicated in FIG. 13. The approach in one or more of FIGS. 3-7 may include adjusting the setpoint offset at an initiation of a call for heat. That may limit the maximum setback amount to less than or equal to the setpoint differential. Also, that approach may return to the initial setpoint after a long burn time without noting the heating performance of the tank. Thus, if a somewhat continuous low demand water draw is in place, the tank may excessively heat at the top, i.e., result in stacking.

An item of block 161 of FIG. 13 may include, instead of immediately adjusting the setpoint offset at an initiation of a call for heat, the temperature change rate may be monitored for an increase or no change in rate. As noted in block 162, an increase or no change in temperature rate may indicate an approximate end of the water usage. At this juncture, the setpoint may be set to the maximum of a "present sensor value plus K" or a "setpoint minus M'", where K is a constant of about 2 degrees F., and M' is about 10 degrees F. The ranges for K and M' may be about 1 to 5 and 5 to 30, respectively. This setpoint setting may signify the maximum setpoint offset allowed. By using this approach, an adjustment of setpoint offset should not cause unwanted cycling of the appliance or draft sources.

In essence, if the temperature change rate is small during a long burn time, then the setpoint should not be returned to the original setpoint because the tank appears still excessively stacked due to a low demand water draw. Only when the heating rate is high enough (and the burner has been on for a long time) may the setpoint offset be reduced.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A water heater control system comprising:
   a water temperature sensor for providing a sense signal indicative of a temperature of water proximate to the sensor;
   a heating element for heating water proximate to the element according to a control signal; and
   a controller having a water temperature set point mechanism for receiving the sense signal and for sending the control signal; and
   wherein:
   the controller determines a water temperature change rate from the sense signal;
   the controller provides the control signal according to the water temperature set point mechanism and the sense signal; and
   the controller detects stacking and compensates the set point mechanism according to the sense signal to keep temperature stacking of the water within a safe limit.

2. The system of claim 1, wherein:
   upon a control signal that initially turns on the heating element when temperature of the water is nearly uniform, a water temperature change rate is determined and saved as a base heat rate; and
   upon subsequent heating of the water by the heating element, if the water temperature change rate is greater than N times the base heat rate where, N is greater than one, then set point is reduced M degrees.

3. The system of claim 2, wherein if a water temperature change rate is less than P times the base heat rate and the sensed temperature is within Q degrees of the set point, then reduce the set point by Q degrees.

4. The system of claim 3, wherein if the water temperature change rate is within (1±R) times the base heat rate, then the set point is reset to an original value.

5. The system of claim 4, wherein after the heating element is turned off at least about L hour, and if the set point is lower than the original value, then increase the set point by V degrees about each L hour.

6. The system of claim 5, wherein if the water temperature becomes less than the set point minus S, and the water temperature rate change is greater than N times the base heat rate for T minutes before the heating rate slows to within (1±R) times the base heat rate and stays at the latter rate for U minutes, then the base heat rate is updated a small increment towards the present water temperature rate change.

7. The system of claim 6, wherein L is in range from 0.25 to 2.5, M is in a range from 5 to 30, N is in a range from 1 to 2.5, P is in a range from 0.1 to 0.4, Q is in a range from 5 to 30, R is in a range from 0.1 to 0.3, S is in a range from 20 to 50, T is in a range from 1 to 8, U is in a range from 1 to 8, and/or V is in a range from 0.5 to 2.5.

8. The system of claim 1, wherein upon a control signal to the heating element to heat water, the water temperature change rate is monitored to note whether there is an increase or no change of the water temperature change rate.

9. The system of claim 8, wherein if the water temperature change rate has an increase or no change, then a set point of the water set point mechanism is set to a maximum of a present water temperature from the sensor plus a constant, or of a present set point minus a maximum set point offset.

10. The system of claim 9, wherein:
    the constant is in a range from one degree to five degrees F.; and
    the maximum set point offset is in a range from ten degrees to thirty degrees F.

11. The system of claim 9, wherein:
    the constant is approximately two degrees F.; and
    the maximum set point offset is approximately ten degrees F.

12. A method for operating a water heater, comprising:
    sensing water temperature in a water heater;
    measuring the water temperature change rate; and detecting whether stacking is occurring; and wherein:
if stacking is occurring, then a set point is lowered to prevent an excessive top temperature;
if stacking is not occurring or reduced to an acceptable level, then the set point is gradually or immediately restored as needed to optimize water heater capacity.

13. The method of claim 12, further comprising:
upon a start of heating water in the water heater, monitoring the water temperature change rate; and
wherein if the water temperature change rate is equal to or greater than zero, then set the set point to a maximum of the present water temperature plus a constant or of the set point minus a maximum set point offset permitted.

14. The method of claim 13, wherein:
if the temperature change rate is small during a long burn time, then the set point is not returned to an initial setting; and
if the heating rate is sufficiently high, and there is a long burn time, then the set point offset is reduced.

15. The method of claim 12, further comprising detecting a basic heating rate (B) upon a start of heating water in the water heater.

16. The method of claim 15, further comprising if a heating rate after the start of heating water is greater than N times B, then reduce the set point by M, wherein N is greater than one and M is less than 30 degrees F.

17. The method of claim 16, further comprising if a heating rate is less than P times B and the water temperature is within Q of the set point, then reduce the set point by Q, wherein P is less than 0.4 and Q is less than 30 degrees.

18. The method of claim 17, further comprising after heating water is stopped for about L hour and if the set point is lower than the initial value, then increase the set point by V about every L hour as needed, and wherein L is less than 2.5 and V is less than 2.5 degrees.

19. The method of claim 18, further comprising if the water temperature is less than a set point minus S, the heating rate is greater than N times B for T minutes before slowing down to within (1±R) times B for U minutes, then update B a small step towards a present heating rate, wherein S is less than 50 degrees, R is less than 0.3, T is less than 8 and U is less than 8.

20. A water temperature control system comprising:
a sensor that detects water temperature in a container;
a heater that heats water in the container; and
a mechanism, having a water temperature set point, connected to the sensor and heater, wherein the mechanism detects a water temperature change rate according to the sensor at initial start-up of the heater and afterwards, the mechanism detects stacking, and the mechanism adjusts the water temperature set point via a set point offset to turn on or off the heater to limit top water temperature within a safe range when the stacking occurs in the container.

21. The system of claim 20, wherein:
if the water temperature change is small during a long heater on time, then the water temperature set point is not returned to an original setting because the stacking of water is still present due to a low water draw from the container; and
if the heating rate is sufficiently high heating rate and there is a long heater "on" time, then the set point offset is reduced.

* * * * *